July 25, 1961  E. H. KENDALL  2,993,393
EDGE ROLL CONTROL FOR WHEEL ROLLING MILLS
Filed May 29, 1957  8 Sheets-Sheet 1
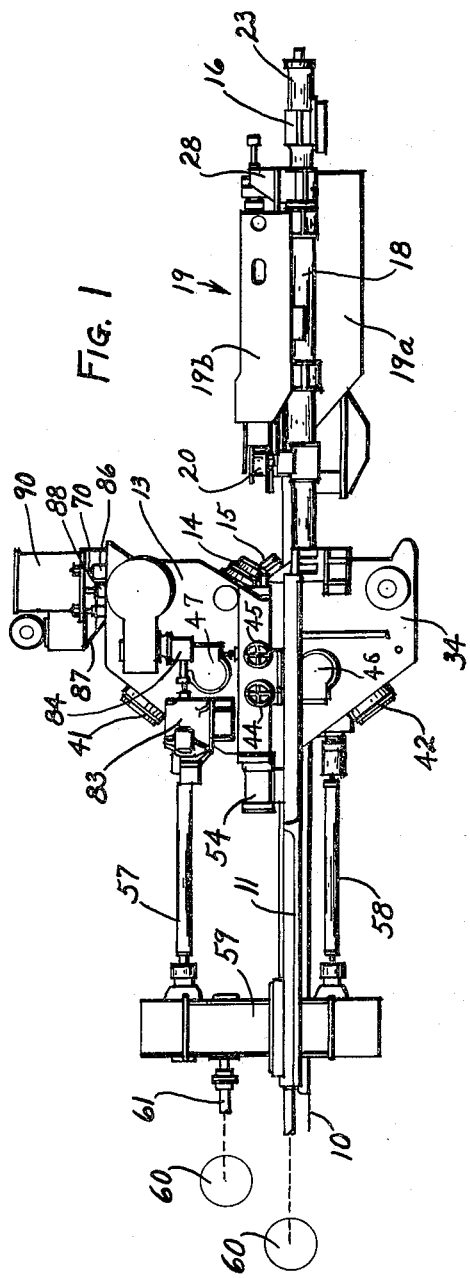
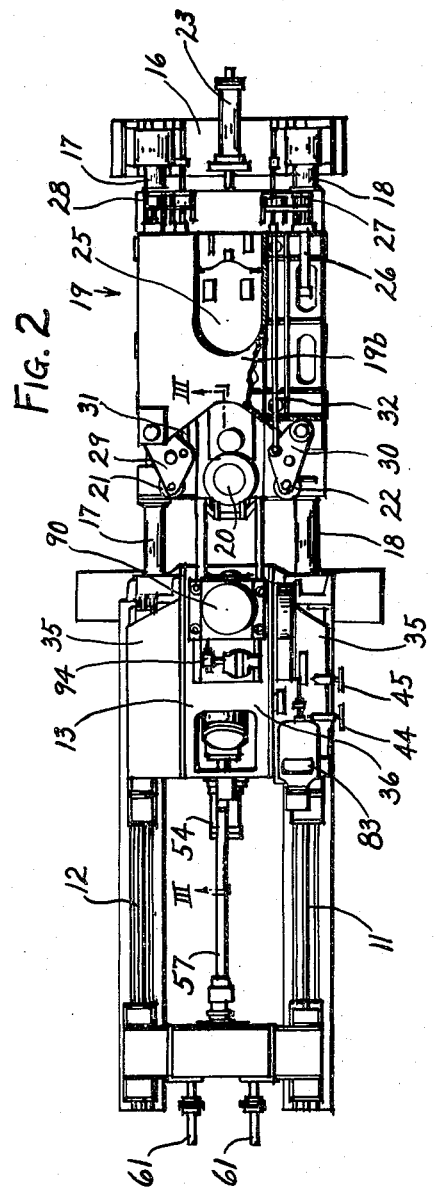
INVENTOR
EDGAR HOMER KENDALL
BY
ATTORNEY

INVENTOR
EDGAR HOMER KENDALL

BY Francis J. Klempay
ATTORNEY

INVENTOR
EDGAR HOMER KENDALL
BY Francis J. Klempay
ATTORNEY

July 25, 1961 E. H. KENDALL 2,993,393
EDGE ROLL CONTROL FOR WHEEL ROLLING MILLS
Filed May 29, 1957 8 Sheets-Sheet 4

INVENTOR
EDGAR HOMER KENDALL
BY Francis J. Klempay
ATTORNEY

July 25, 1961 E. H. KENDALL 2,993,393
EDGE ROLL CONTROL FOR WHEEL ROLLING MILLS
Filed May 29, 1957 8 Sheets-Sheet 5

INVENTOR
EDGAR HOMER KENDALL
BY Francis J. Klempay
ATTORNEY

July 25, 1961 E. H. KENDALL 2,993,393
EDGE ROLL CONTROL FOR WHEEL ROLLING MILLS
Filed May 29, 1957 8 Sheets-Sheet 6

INVENTOR
EDGAR HOMER KENDALL
BY
Francis J. Klempay
ATTORNEY

INVENTOR
EDGAR HOMER KENDALL

United States Patent Office 2,993,393
Patented July 25, 1961

2,993,393
EDGE ROLL CONTROL FOR WHEEL
ROLLING MILLS
Edgar Homer Kendall, Alliance, Ohio
Filed May 29, 1957, Ser. No. 662,540
2 Claims. (Cl. 80—16)

The present invention relates generally to metal working and forming apparatus and more particularly to control apparatus for employment with mills of the general character used in production of large metal wheels, as for example, the type commonly utilized on railroad vehicles, whereby a superior semi-finished wheel is obtained in a minimum of time and whereby a minimum of additional machine finishing operations are required.

To facilitate further discussion of the present invention it is first necessary to examine the desired final product of the wheel mill and define terms which will be used throughout the present specification and claims. As is well known in the art a "blank" is conveyed into the wheel mill for further working by the various sets of rolls thereof. This "blank" has been pre-heated and has been previously worked, by forging methods for example, to roughly the general shape of the final product but has a smaller diameter than the finished wheel. A "finished wheel," a blank which has been properly formed by a wheel mill and although such a wheel may be, and preferably is, subjected to further machining and/or forming operations this term is used to designate a workpiece which has been formed by a wheel mill, comprises three main integral structural parts. The first integral portion of the finished wheel is the "hub" or center portion of the wheel having a certain axial dimension while the second integral portion comprises the "peripheral edge portion" or "rim" of the finished wheel which is spaced radially outwardly of the hub and has a certain axial dimension, usually less than that of the hub. The outer peripheral surface of the rim or peripheral edge portion forms the road or rail bearing "tread" of the finished wheel. The other portion of the finished wheel is the "web" or "plate" which interconnects the rim or peripheral edge portion and the hub. The web is of much thinner axial dimension than either the hub or the rim of the finished wheel.

As is well known in the prior art, wheel mills generally comprise various sets of forming rolls which are adapted to engage and form a blank along each of its co-ordinate axes substantially to the dimensions and contours desired in the finished product thereby providing a finished wheel. Thus, in a horizontal wheel mill guide rolls and pressure rolls are adapted to engage the blank at various points about its rim for accurately contouring the same while opposed pairs of edge rolls engage the top and bottom surfaces of the blank and are operative to form the web or plate and the side edges of the rim. A preferred general construction of such a mill is disclosed and claimed in my United States Patent No. 2,763,168, entitled "Wheel Rolling Mill," which is made of record for those desiring a more complete description of such a mill than is contained herein.

One of the standard specifications for finished wheels as advanced by the Mechanical Division of the Association of American Railroads, the American Society of Testing Materials and the American Transit Association, and as compiled in the Steel Product Manual entitled "Wrought Steel Wheels" published by the American Iron and Steel Institute, 350 Fifth Avenue, New York 1, N.Y., in February 1955, for example, is that the web or plate of the wheel must be of less axial thickness near the rim than near the hub with this difference in axial thickness preferably being evidenced in a "tapered" web portion decreasing in axial thickness from the hub to the rim. The critical dimension is the thickness of the web or plate adjacent the rim and a wheel is unacceptable if its web is of less thickness at any point than the required thickness adjacent the rim. Heretofore it has been practically impossible to meet specifications requiring a tapered web because of the small differences in thicknesses required (one eighth to one half of an inch in a web having a minimum thickness of one to two inches, for example) and the very large rolling pressures required. Thus, the railroads and other users of such wheels have been forced to accept wheels not meeting the above mentioned specifications with regard to certain aspects of the plate or web thickness.

A tapered web on a finished wheel can be obtained, of course, by properly controlling the position of the edge rolls during rolling operations. However, such control has been heretofore impossible to obtain since, as mentioned above, the amount of taper is slight and the pressures required are very high for the proper working of the blank. Further, as will be appreciated by those skilled in the art, the diameter of a blank increases appreciably during forming in a wheel mill and any control of the edge rolls of such a mill must be correlated with and responsive to this "wheel growth." Also, it is impossible to obtain a plurality of roughly forged blanks which are exactly alike with respect to their thickness dimensions and since the critical dimension of the web is the thickness thereof adjacent the rim of the amount of inclination or taper of the web must be varied in accordance with the initial size of the individual blank. The control of the edge rolls must therefore be responsive to the initial measurements of the blank. All of the above problems and requirements have heretofore made it impossible to provide adequate control means for the edge rolls of a wheel mill and have caused the railroads and other users to accept products not meeting the specifications outlined above.

It is therefore the ultimate or primary object of the invention to provide control means for the edge rolls of wheel rolling mills whereby these rolls may be accurately controlled in accordance with a predetermined manner to perform the desired operations on a workpiece being formed.

A further object of the invention is to provide an edge roll control for wheel mills wherein a tapered web is easily obtained thereby providing a superior final product.

Another object of the invention is to provide control means of the character described which is responsive to the measurements of each individual blank whereby individual differences in the blanks are compensated for to provide a smooth and continuous taper. In this respect, the inclination or taper is changed automatically in accordance with the initial axial thickness of the web of each blank.

Another object of the present invention is to provide an edge roll control wherein the downward movement of the edge roll is correlated with the radial growth of the wheel being worked upon.

A more specific object of the invention is to provide an edge roll control embodying new and novel linkage or integrating means responsive to wheel growth and initial size of the blank, as well as the instantaneous position of the edge roll during forming operations, for actuating the movement of the edge roll of a wheel mill.

A further object of the invention is to provide a novel fluid control circuit, embodying an improved arrangement of valves and other components, for utilization as an integral part of the edge roll control means.

Another object of the invention is to provide several alternate fluid control circuits which may be used to control the edge roll of a wheel mill.

An ancillary object of the invention is to provide improved means for mechanically mounting the edge roll of a wheel mill wherein infinite adjustment of the same within a limited range is readily provided.

The above, as well as other objects and advantages of the invention, will become more readily apparent upon consideration of the following specification and accompanying drawing wherein there is described and shown an illustrated embodiment of the invention:

In the drawings:

FIGURE 1 is a side elevation of apparatus for hot working and forming metal wheels embodying control apparatus constructed in accordance with the teachings of the present invention;

FIGURE 2 is a plan view of the apparatus of FIGURE 1;

*General mechanical arrangement*

Figure 3:
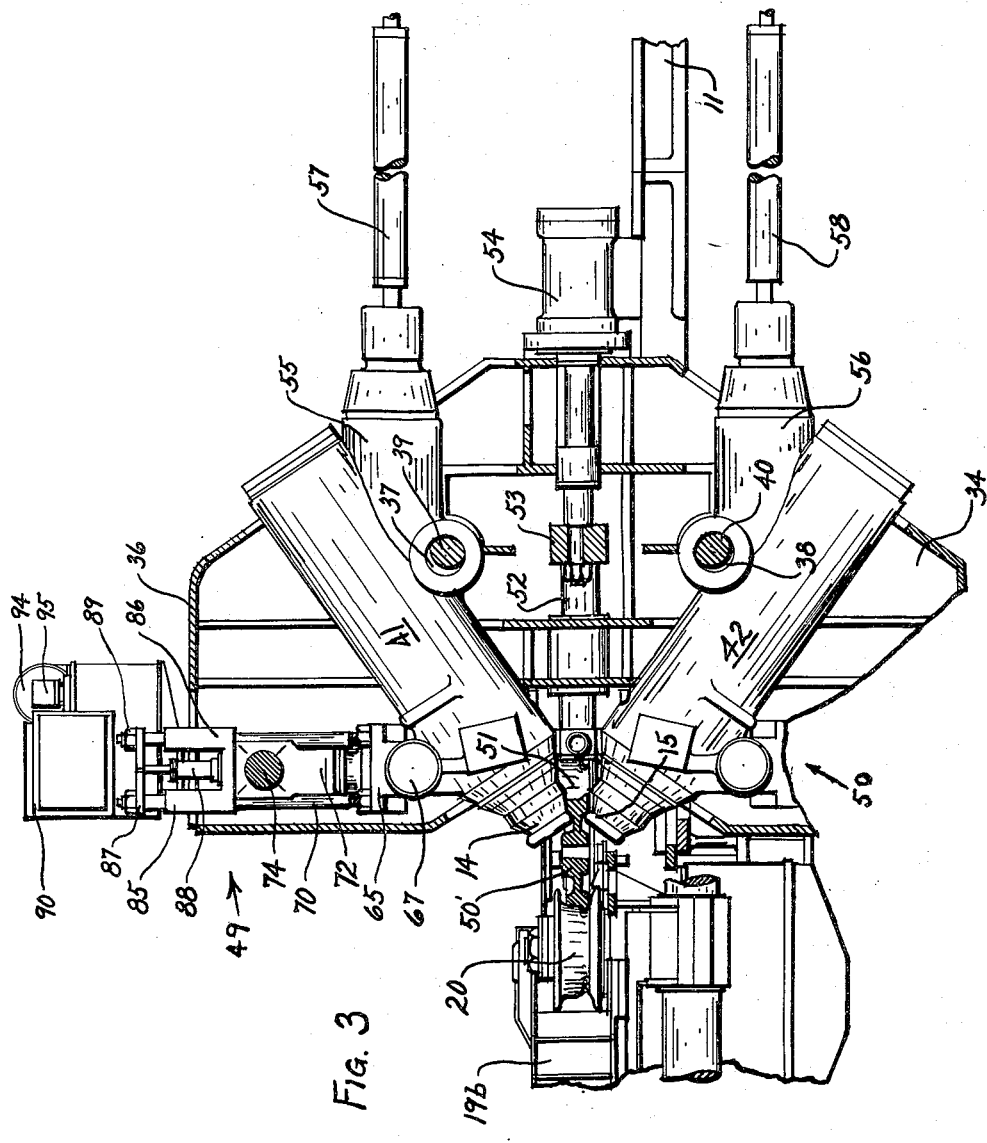
FIGURE 3 is an enlarged sectional view taken along the section line III—III of FIGURE 2 showing particularly the arrangement of elements for working a metal wheel blank.
Figure 4:
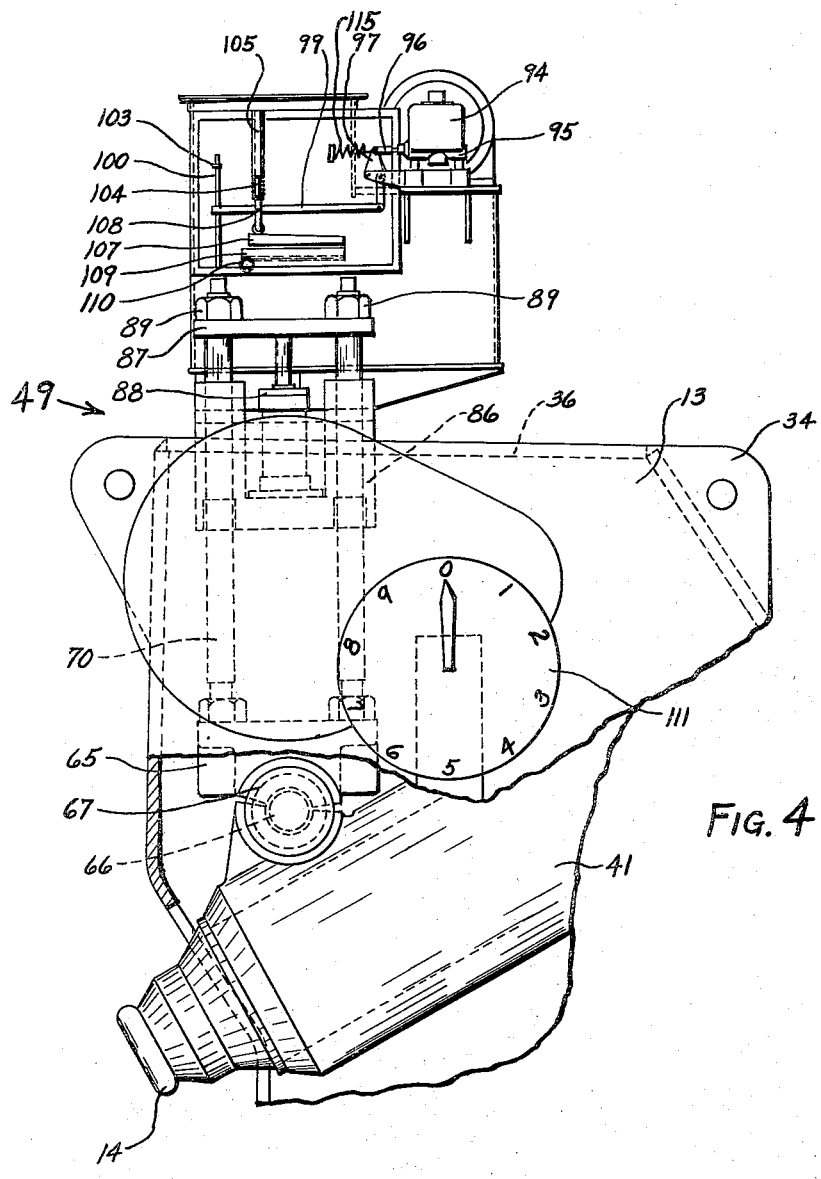
FIGURE 4 is a side view of the top edge roll showing a portion of the control means therefor.

Considering first the general mechanical arrangement of a wheel mill embodying control means constructed in accordance with the teachings of the present invention and referring initially to FIGURES 1 and 2 of the drawing, the reference numeral 10 designates a concrete or other suitable foundation upon which is mounted a pair of spaced parallel tracks 11 and 12. Mounted upon tracks 11 and 12 at the right hand end portion thereof and disposed substantially vertically therebetween is a mounting frame 13 for an upper edge roll 14 and a lower or anvil edge roll 15 which, as will be hereinafter more fully explained, are adapted to act upon and form the web and the side edges of the rim portions of a blank being processed in the wheel mill.

Supported at one end in the frame 13 and at the other end by stanchion 16 mounted on the foundation 10 is a pair of spaced parallel guide rods 17 and 18 which serve to mount a carriage 19 for slidable movement toward and away from the frame 13. As will become more fully apparent, the carriage serves to mount a main or anvil roll 20 and a plurality of guide rolls 21 and 22 which are adapted to cooperate with the upper and lower edge rolls 14 and 15 to hot-work and form a metal blank in the manner desired.

The carriage 19 comprises two parts 19a and 19b which are movable longitudinally as a unit toward and away from frame 13 and are also relatively movable longitudinally as will be further explained. The principal part of the carriage, 19a, is slidably supported on the rods 17 and 18 and is longitudinally movable toward and away from the housing 13 by a large hydraulic actuator 23 mounted on the foundation 10. This portion of the carriage mounts the vertically journaled main or anvil roll 20 which is adapted to be driven through suitable gearing, not specifically shown, by a large electric motor 25 mounted on and intermediate the ends of the portion 19a of the carriage. The other and top portion 19b of the carriage 19 is usually and normally carried in longitudinal movement by carriage portion 19a but is also movable longitudinally with respect to this carriage portion. Carriage portion 19b mounts at each side thereof a hydraulic actuator 26 having a piston rod 27 extending rearwardly toward and connected to a transversely disposed crosshead 28 of the carriage portion 19a. Thus it will be apparent that by suitable application of fluid pressure to the actuators 26 the carriage portion 19b may be caused to move rearwardly or forwardly with respect to carriage portion 19a. With fluid trapped in these actuators, however, the carriage portions 19b and 19a will be held in relatively fixed relation and will be caused to move together upon actuation of hydraulic actuator 23.

Mounted on each side of carriage portion 19b near the forward end thereof, and adapted for pivotal movement in a horizontal plane toward and away from the anvil roll 20 are carrier arms 29 and 30 which vertically journal at their outward ends the guide rolls 21 and 22 respectively. Pivotally secured to the arms 29 and 30 at points intermediate the pivotal mounting of these arms and the guide rolls carried thereby are tie rods 31 and 32 which extend rearwardly from carrier arms 29 and 30 to the crosshead 28 of carriage portion 19a and are secured thereto. Thus, relative movement of the carriage portions 19a and 19b will cause pivotal movement of arms 29 and 30 to carry guide rolls 21 and 22 simultaneously toward and away from the main or anvil roll 20.

The frame 13 comprises spaced vertical side walls 34 which are rigidly and securely mounted by outwardly extending cantilevered arms 35 upon tracks 11 and 12. The side walls 34 are maintained in spaced relation by means of top and bottom walls 36 and other suitable transversely disposed structural members as shown in FIGURE 3. Pivotally mounted in the frame 13 by means of eccentric reaches 37 and 38 mounted on shafts 39 and 40 extending between and journaled in the side walls 34 are the journal housings 41 and 42 for edge rolls 14 and 15. The shafts 39 and 40 may be rotated upon proper manipulation of hand wheels 44 and 45 operating through worm reduction gearing 46 and 47. The purpose of this adjustment is best described with reference to FIGURE 3 of the drawing wherein is shown a wheel 50′ being formed in my apparatus. It will be observed that the edge rolls 14 and 15 are contoured to act on the web or plate portion of the wheel as well as the axial end edges of the rim of the wheel. Thus, for example, if it is desirable to provide a wheel having a rim which is of greater radial thickness at the lower side, exclusive of the flange portion of the wheel, the shafts 39 and 40 may be suitably adjusted by proper manipulation of hand wheels 44 and 45 whereby the pivot point of lower housing 42 is shifted substantially forward of the pivot point of the upper journal housing 41. In normal use it is contemplated that adjustment of the journal housing pivots will be but infrequently required, and accordingly only hand wheel adjustment is shown. It should be understood, however, that the hand wheels 44 and 45 may be replaced by suitable remote operated power means wherever desirable.

According to the teaching of the above identified patent application, the journal housing 41 and 42 and edge rolls 14 and 15 journaled therein are adapted to be pivoted away from the position shown in FIGURE 3 by mechanism generally indicated by the reference numerals 49 and 50 whereby a blank may be conveyed from allied forging apparatus, not shown, into the wheel mill. The raising and lowering mechanism 49 for the upper edge roll will be hereinafter more fully described while the lower edge roll 15 serves as an anvil roll and the raising and lowering mechanism 50 is similar to that described in my above identified patent. For the present it is sufficient to note that the thickness of the web or plate and the rim, as well as the contour thereof, will depend upon the relative separation and positions of the edge rolls during rolling operations.

In a wheel forming operation wherein the anvil roll 20 is moved against the outer periphery of a wheel 50' and is retracted in response to wheel growth it is, of course, necessary to oppose the force exerted by the anvil roll, and for this purpose there are provided a pair of pressure rolls 51, one of each side of the axis of longitudinal movement of anvil roll 20, mounted on the frame 13. Pressure rolls 51 are journaled and carried by longitudinally extending rods 52 which extend through annular bearings and terminate at and are carried by a cross bar 53; the arrangement being such that upon movement of cross bar 53 the movement of pressure rolls 51 must be equal and simultaneous. Movement of cross bar 53 is accomplished by a hydraulic actuator 54 mounted on frame 13 and having driving connection with the cross bar 53 and operated in such a manner the pressure rolls will move under a predetermined force.

For rotating the edge rolls 14 and 15 the journal housing 41 and 42 have integral and horizontally extending portions 55 and 56, respectively, which contain suitable gearing means, not shown, interconnecting the edge rolls with universal wobbler shafts 57 and 58. The wobbler shafts are connected on their other ends to a speed reducing gear box 59 mounted on the tracks 11 and 12 which is motivated by prime mover means 60 operating through shafts 61 leading to the speed reducing gear box 59.

The above recited structure is shown generally in my issued Patent No. 2,763,168. It should be apparent that a wheel mill constructed in accordance with the teaching contained therein is characterized by its extreme flexibility and versatility.

*Upper edge roll mounting*

Considering now the specific mounting employed for raising and lowering the journal housing 41 and consequently the top edge roll carried thereby, designated generally by the reference numeral 49, reference should be had to FIGURES 3-6 of the drawing.

The upper journal housing 41 further comprises an integral and vertically extending pad portion 63 of appreciable transverse dimension which is adapted to cooperate with a similar pad portion 64 extending downwardly from a fitting 65. The upper and lower surfaces of the pad portions 63 and 64 have a concave contour and located between these surfaces is a relatively large diametered rod 66 which serves to evenly distribute the pressure exerted upon fitting 65, this pressure being applied in a manner described below, over the surfaces of pad portions 63 and 64 regardless of the relative angular disposition thereof. Circular end caps 67 and 68 are provided to prevent separation of the pad portions 63 and 64 whereby when pad portion 64 is drawn upwardly the journal housing 41 will also be drawn upwardly into a retracted position.

The top surface of the fitting 65 is generally flat and this fitting is vertically apertured at the four corners thereof to threadably receive the lower ends of four vertically extending guide rods 70 while the center portion of the upper surface of this fitting serves as a bearing surface for the large diametered piston 71 of a large ram cylinder 72. The cylinder 72 has a pair of transversely extending and integral trunnions 73 on opposite sides thereof which terminate on their end portions in integral rod portions 74. The rod portions 74 of the trunnions are journaled by bearings 75 within annular and rotatable members 76. The annular and rotatable members 76 are of varying wall thickness throughout their circumferences and are in turn journaled by annular bearings 77 in the side walls 34 of the frame 13. Each of the annular and rotatable members 76 has a shoulder on the outer end portion thereof which mounts a pinion gear 78. A T-shaped keeper 79 extends into the center opening of each of the members 76 and is attached by bolts, not specifically shown, running the axial length thereof to the end of the rod portion of the trunnion. The enlarged head portion of the keeper 79 serves to retain the parts just described in operative assembled relation as is apparent.

For rotating the pinion gears 78 and consequently the annular members 76 attached thereto, I provide smaller pinion gears 80 disposed behind and meshing with the pinion gears 78. These last mentioned gears are keyed to a common shaft 81 which transversely spans and is journaled in the side walls of the frame 13. One end of the shaft 81, the lower end in a plan sectional view, FIGURE 6, protrudes through the pinion gear 80 carried thereon and also mounts a worm wheel 82. This worm wheel 82 is driven by an electric motor 83 mounted on the frame 13 through additional gear reducing means shown generally at 84.

It will thus be apparent that when the motor 83 is energized the angular disposition of the annular members 76 will be changed thereby changing the relative vertical heighth of the upper edge roll mounting mechanism with respect to the center line of the machine. The use and function of such an adjustment will be hereinafter more fully explained.

The guide rods 70, four in number and having their lower end portions attached to the corners of fitting 65 as hereinbefore described, extend through the apertured leg portions 85 of a pair of U-shaped members 86 resting on the top edge surfaces of the transversely extending trunnions 73. The U-shaped members 86 are rigidly attached to the trunnions on opposite sides of the ram cylinder 72 and each of these members accommodate a pair of the guide rods 70. The thus defined pairs of the guide rods 70 are tied together by cross pieces 87 which are connected with the piston rods of lifting cylinders 88 resting on the bottom portions of the U-shaped member 86 in the manner shown.

The arrangement is such that the upper journal housing 41 and the edge roll 14 are adapted to be lowered into rolling position upon fluid being supplied to the ram cylinder 72 and are adapted to be retracted to open the mill when the lifting cylinders 88 are actuated in a proper manner. Obviously, the final or extreme lowest position of the edge roll will be when the cross pieces 87 carried by the guide rods 70 abut against the upper surface of the leg portions 85 of the U-shaped members 86. The final position of the edge roll will be changed, however, when the angular disposition of the annular members 76 is changed to change the relative positioning of the upper edge roll mounting mechanism with respect to the center line of the rolling mill. Thus, a convenient and accurate means is provided for changing the final "down" position of the top edge roll.

Of course, the final down position of the upper edge roll with respect to the center line of the machine may be regulated by effectively changing the stroke of the lifting cylinders 88 and this could be accomplished by providing adjustable stops to adjustably limit the travel of the pistons of these cylinders. In this preferred modification of the upper edge roll mounting the annular eccentrics 76 and the appurtenant driving equipment therefore would not be employed. However, the specific means employed for regulating the final down position of the upper edge roll must be capable of accurate regulation since the changes in the final down position are of relatively small magnitude. The adjustment of the final separation of the rolls is usually made when preparing the mill for rolling operations and is not changed, or at least infrequently so, during rolling operations.

As indicated above, the structure of the means generally indicated at 50 for mounting the lower edge roll is similar to that shown in my issued patent and will not be described herein. The upper edge roll also embodies control instrumentalities which allow the formation of a finished wheel in accordance with a predetermined pattern, including, if desired, a tapered web or plate portion. In effect, the lower edge roll 15 serves as an anvil roll while the upper edge roll 14 is actuated in the desired manner. This type of operation provides a desired finished wheel as, even though the bottom surface of the web or plate is flat and the taper is evidenced on the upper surface of the web or plate, the finished wheel is transferred to a conning or dishing press, not shown, after rolling where the plate or web is given its final conical form and any inequities in the amount of taper on the top and bottom surfaces of the wheel are compensated for. After such pressing operations it is practically impossible to tell which side of the web or plate was formed by the anvil or lower edge roll and which by the controlled upper edge roll. These control instrumentalities are now to be described.

Upper edge roll control

It will thus be seen that the problem of obtaining a desired final product meeting the required specifications depends upon proper control of the upper edge roll. Since the upper edge roll will move in accordance with the amount or volume of fluid supplied thereto such control can be effected by properly regulating the amount of fluid passed to the ram cylinder 72.

Mounted directly on top of the ram cylinder 72 is a reservoir 90 of fairly large capacity which has immersed in the fluid contained therein a pre-fill or dump valve 91 having a direct connection via a fitting 92 and passageway 93 to the head end of the ram cylinder 72. The pre-fill or dump valve 91 is constructed in such a manner that upon initial downward movement of the edge roll 14 when pressure is applied to the lifting cylinders the ram cylinder is quickly filled by gravity flow from the reservoir 90. However, when the blank is encountered and pressure begins to build up in the various cylinders the pre-fill or dump valve 91 is operative, by control means to be later described, to allow only the fluid delivered by pump 94 mounted on the reservoir to be admitted to the head end of the ram cylinder. The pump 94 in essence provides a variable delivery pressure source for metering the flow of fluid to the ram cylinder and thus the movement of the upper edge roll. A pump of axial piston design is contemplated because of the low inertia of its parts and ease of controllability although any variable delivery pressure source may be used.

The pump 94 is in turn controlled by a control cylinder 95 which regulates the output of the pump in accordance with the position of its piston, not shown. When the piston is all the way to the right, see FIGURE 4, the pump 94 will deliver maximum output but when the piston of the control cylinder is all the way to the left the pump will deliver zero output. At any piston position between these two extreme positions the pump 94 will deliver a specified output somewhere between zero and its maximum output.

As described in the objects of the invention, it is necessary to regulate the downward movement of the upper edge roll in response to the initial dimensions of the individual blank being formed, the wheel growth and the instantaneous position of the upper edge roll during rolling operations. In light of the apparatus herein described this can be accomplished by correlating the position of the control cylinder piston with these variables.

For accomplishing this end piston rod 96 of the control cylinder 94 is pivoted to a bellcrank 97. Also pivoted to this bellcrank is a vertically depending link 98 which is pivoted on its lower end to the end of a generally horizontally extending and elongated operating lever 99. The other end of the lever 99 has an aperture therein through which extends an operating rod 100 which is rigidly attached to one of the guide rods 70 and thus movable with the upper edge roll 14. Threadably and adjustably received on the upper end of the operating rod 100 is an abutment nut 103 which is adapted to engage and move the operating lever 99 at various times upon downward movement of the upper edge roll. The operating lever 99 is pivoted intermediate its ends to a spring-mounted follower rod 104 slidable in a cylindrical member 105 and mounting a template follower roller 106 on its lower end. The template follower roller 106 is adapted to engage and follow the contours of the camming surface of template 107 so that the pivot point 108 intermediate the ends of the operating lever 99 will depend upon the shape and position of template 107.

The template 107 is pivotally attached on one of its ends to an elongated rack 109 which is adapted to be driven by a pinion 110. The pinion 110 will be driven in response to and in a manner dependent upon the growth of the wheel being worked upon. All wheel mills, irrespective of type or style, embody some type of indicator means for showing the operator the diameter of the wheel at any instant during rolling and in the present instance this means comprises a dial indicator 111 mounted on the frame 13 and operated in response to movement of the anvil roll 20. Thus, the pinion may be actuated by the dial indicator 111, as shown schematically in FIGURE 7, through suitable linkage, not shown. The pinion 110 may be driven directly from the movement of the anvil roll 20 but, irrespective of the means for driving the pinion, this means must be operative in response to the wheel growth during rolling operations.

The template 107 is pivotally mounted on the rack 109, and, according to the teachings of the present invention, the pivotal position of the template will depend upon the initial thickness of the web or plate portion of the blank before rolling and forming operations are started. This arrangement is illustrated schematically in FIGURE 7 and measurement of the web thickness may take place at a separate measuring station outside the wheel mill or, preferably, in the wheel mill proper before rolling operations begin. Such an indication would be transmitted through various linkage means, not specifically shown, for pivoting the template 107 in accordance with the initial web or plate thickness of the blank. In any event, regardless of the means utilized to obtain and transmit this measurement, the pivotal position of the template 107 will be dependent thereupon.

Considering now the utiliziation of the control instrumentalities above described, it will be assumed that the template has been pivoted to a position dependent upon the thickness of the blank and this effectively determines the initial vertical position of pivot point 108 intermediate the ends of the operating lever 99. As heretofore explained, when the upper edge roll comes into contact with the blank further downward movement of this roll is dependent entirely upon the fluid supplied by the variable delivery source 94. The output of this pump will of course depend upon the positioning of the piston of control cylinder 95. At the instant the pump 94 begins to supply fluid to the ram cylinder 72 the output of this pump will be at a maximum rate, either at the pump's maximum output if the abutment nut 103 has not engaged the end of operating lever 99 or at some other maximum output if the abutment nut 103 has engaged the end of the operating lever 99. Whether the abutment nut has engaged the operating lever or not at the time of initial rolling contact will depend upon the relative vertical heighth of the pivot point 108 which has been previously adjusted in accordance with initial blank thickness. Such an adjustment or control is necessary to prevent the formation of a "ridge" on the blank if the thickness of the same happens to be larger than a preset standard. Since the position of the control cylinder piston controls the output of the variable delivery source which in turn controls the rate of movement of the edge roll, the edge roll will continue to move downward at an initial speed when rolling contact is made best adapted for the thickness dimension of a particular blank.

Figure 7:
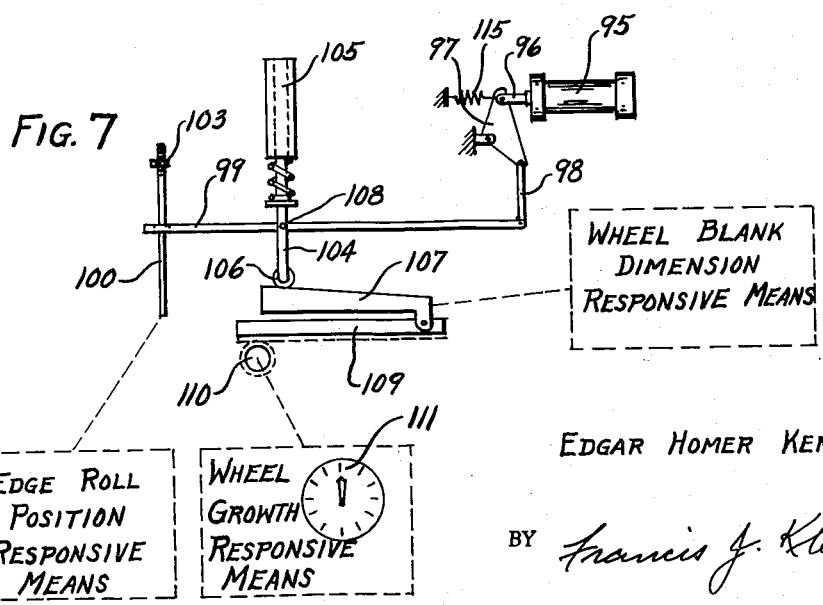
FIGURE 7 is an enlarged schematic view of the linkage or integrating means for controlling the movement of the edge roll.

As soon as the forming operation begins the blank diameter will begin to increase and the pinion 110 will be driven in response to this wheel growth to drive rack 109 thereby moving the template 107 to the left as observed in FIGURE 7. This causes the heighth of the pivot point 108 of the operating lever to be lowered in accordance with wheel growth and as this point is lowered, assuming that the end of the operating lever moves away from the abutment nut 103, the piston of the hydraulic cylinder will be forced to the right under the influence of compression spring 115 to increase the output of pump 94 and hence the rate of descent of the edge roll. If the abutment nut 103 and the pivot point 108 move at exactly the same rate, an admitted special case, there will be appreciably no change in the rate of downward movement of the edge roll. However, if the operating rod 100 and abutment nut 103 moves faster than the vertical movement of pivot point 108 the actuation of the control cylinder will be such to reduce the volume of fluid delivered by pump 94 and hence the rate of descent of the upper edge roll. Thus, the rate of descent of the upper edge roll depends upon the relative instantaneous positioning of the pivot point 108 and the abutment nut 103. And the positioning of the pivot point 108 depends upon the initial size of the blank and the amount of taper desired in the web or plate portion of the finished wheel. The taper desired is controlled by the shape of the template but the specific inclination of the taper is varied by adjusting the pivotal position of the template in response to the initial blank size. The control of the rate of lowering of the upper edge roll is self-correcting in that if the edge roll is being lowered too fast the abutment nut will engage the operating lever 99 to further limit the volume of fluid supplied to the ram cylinder 72 thereby decreasing the rate of descent thereof. In this respect the upper edge roll control acts as a servo-mechanism as is readily apparent.

The rolling operation continues with the web being formed under the influence of its control as above described until the cross pieces 87 abut against the U-shaped members 86 and this is the final down position of the upper edge roll. When the final down position is reached the edge rolls will have almost completely formed the web or plate and will be working the side edges of the rim and the web closely adjacent thereto. The thickness of the web or plate closely adjacent the rim is the critical dimension and by providing the positive stop means comprising the cross pieces and the U-shaped members it is always insured that the finished wheel will have the required dimensions.

Figure 12:
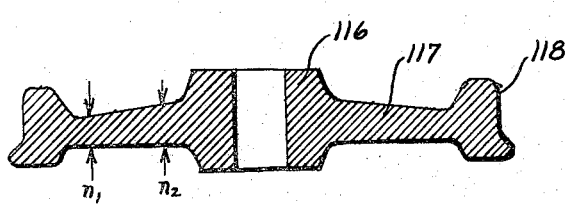
FIGURE 12 is a side sectional view of a finished workpiece which may be obtained from a wheel mill incorporating the teachings of the present invention.
Figure 5:
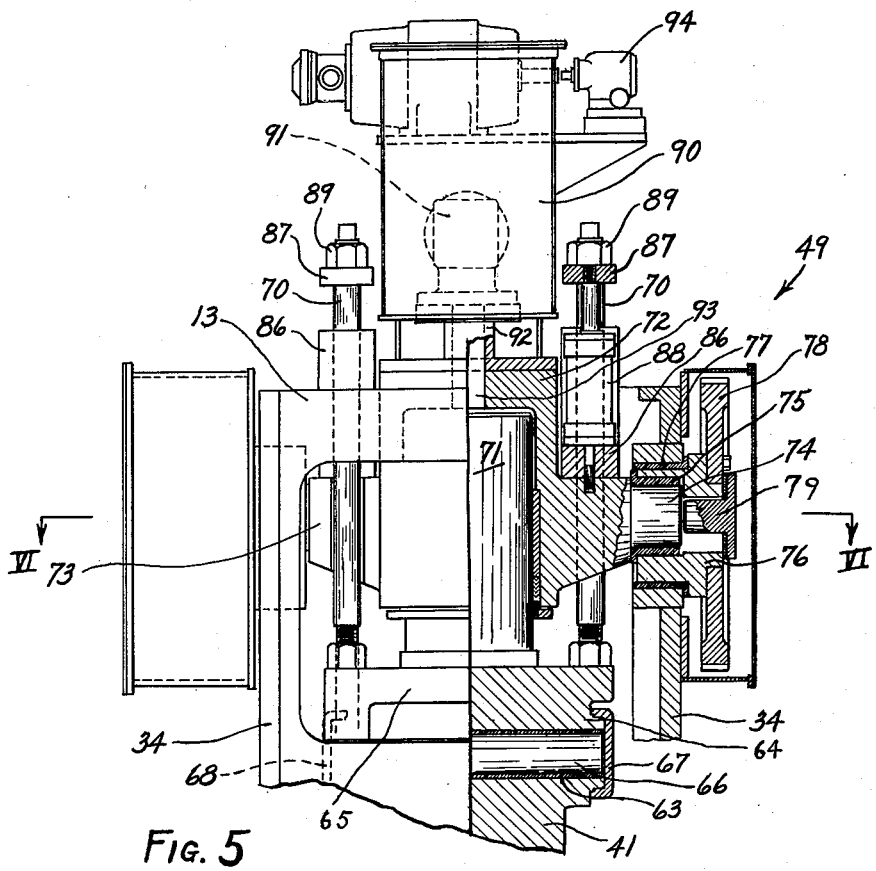
FIGURE 5 is a front view, partially in section, of the apparatus of FIGURE 4.
Figure 6:
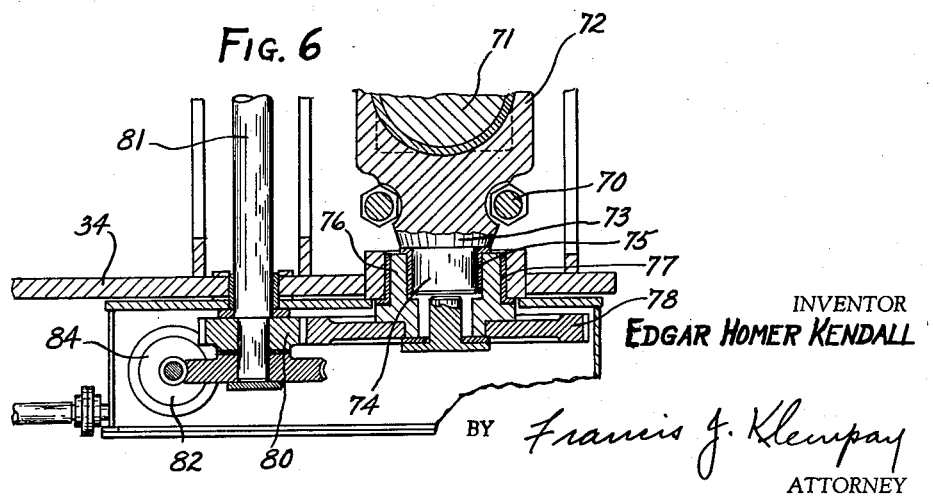
FIGURE 6 is a fragmentary plan sectional view taken along the section line VI—VI of FIGURE 5.

In FIGURE 12 of the drawing there is shown a sectional view of a finished wheel obtainable with the wheel mill of the present invention comprising a hub portion 116, a web or plate portion 117 and a rim portion 118. The web or plate portion 117 is slightly tapered from the hub to the rim with the thickness dimension $n_2$ being larger than the thickness dimension $n_1$ as shown. Of course, other shaped wheels or like products are readily obtainable with the present wheel mill by selection of a properly contoured template and adjustment of the final edge roll position.

It should be understood, however, that the upper edge roll may be controlled by other instrumentalities than those described above. Thus, a Hague hydraulic relay might be employed to actuate the control cylinder 95 instead of the mechanical linkage described above as will be readily apparent to those skilled in the art, but, irregardless of the control means utilized and employed, the upper edge roll must be responsive to and controlled by the rate of wheel growth, the initial size of the wheel blank and the instantaneous position of the edge roll itself in order to obtain the desired finished wheel. Another example of a modification which might be employed for replacing the mechanical means actuating the pump 94 is the use of a first sensing device movable in response to movement of template 107 and a second sensing device movable in response to the position of the upper edge roll. These sensing devices would generate phase related electrical signals operating through a feedback amplifier and other control circuitry to control the output of the pump 95.

Fluid control circuit

Figure 8:
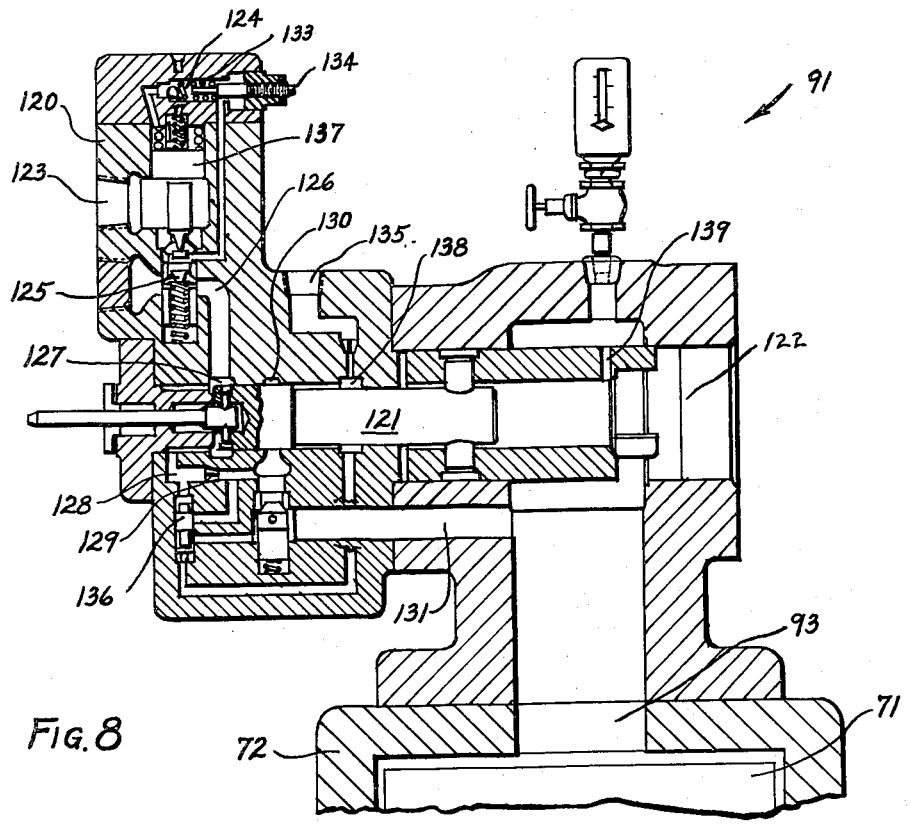
FIGURE 8 is a side sectional view showing the structure of a pre-fill or dump valve and connections thereto as utilized in the present apparatus.
Figure 9:
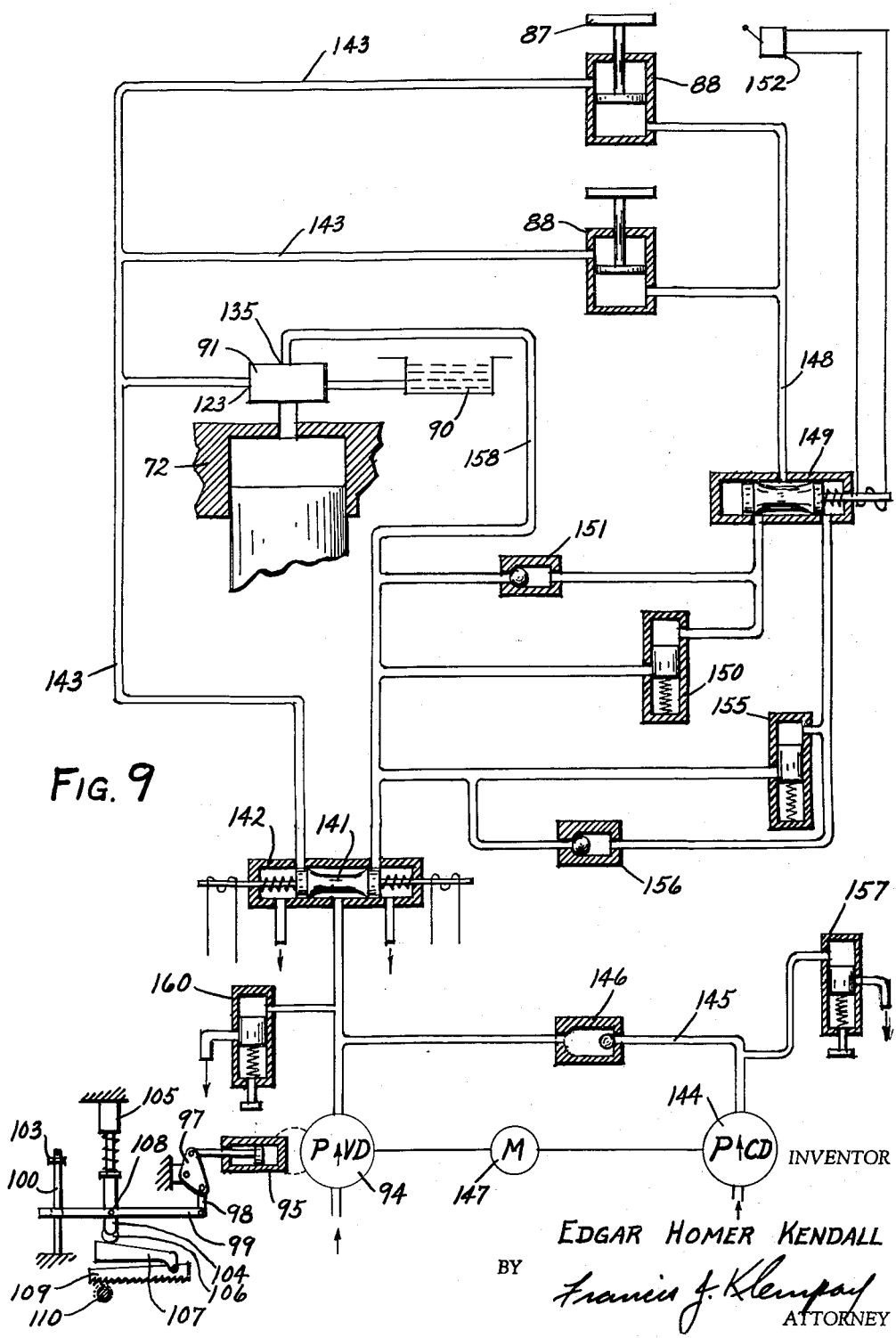
FIGURE 9 is a schematic view of a preferred fluid circuit for actuating the edge roll of a wheel mill.

Referring now to FIGURES 8 and 9 of the drawing wherein there is shown an enlarged sectional view of the pre-fill or dump valve 91 and a schematic view of a preferred fluid control circuit for the upper edge roll.

The pre-fill or dump valve 91 is in essence a pressure responsive fluid switch and is shown to comprise a properly bored and machined housing 120 having various passageways and component parts therein. A large valve piston 121 is movable within the valve housing 120 to block the flow of fluid from the reservoir 90 to the ram cylinder 72 but when this member is in the position shown in the drawing fluid flows from the reservoir 90 through passageways 122 and 93 to the ram cylinder 72. The valve piston 121 is adapted to be moved to the right, however, to a closed position so that only fluid supplied from pump 94 is supplied to the ram cylinder.

The fluid supplied from the variable delivery source, pump 94, is connected to port 123 of the valve and when the pressure of the fluid supplied thereto rises to a high enough value the ball of an internal check valve 124 is forced from its seat so that fluid is directed over check valve 125 and through passageway 126 to a chamber 127. The fluid in chamber 127 flows through passageways 128 and restriction fitting 129 to the chamber 130 and thence to the ram cylinder via passageway 131. The restriction fitting 129 is such that a back pressure is built up on the valve piston 121 causing this member to be shifted to the right thereby blocking the ram cylinder from the reservoir and the only fluid supplied to the ram cylinder after the valve piston moves to its closed position is that supplied to port 123 by the pump 94. In accordance with usual practice, the pressure exerted by spring 133 on the ball of check valve 124 is adjustable by proper manipulation of knob 134 and thus the pressure at which the pre-fill or dump valve 91 is operative is easily controlled.

After the piston valve has moved to the right the rolling of a blank starts and continues with the downward movement of the upper edge roll moving in accordance with the fluid supplied by pump 94. After rolling, when the edge roll reaches its bottom stop position, it is then necessary to release the pressure in the ram cylinder 72 and retract the upper edge roll to allow unloading of the finished wheel and loading of the next blank. This retraction is accomplished by proper actuation of the lifting cylinders 88 but obviously the high pressure in the ram cylinder must be relieved before the lifting cylinders can raise the upper edge roll assembly. Also, the ram cylinder must be relieved or decompressed in such a manner that violent shock and impact on the fluid apparatus is precluded.

To accomplish this decompression of the ram cylinder the port 123 is switched to tank, by means which will be later described, and fluid under pressure is supplied to port 135. The fluid delivered to port 135 flows through various internal bores of the valve and moves a slide valve 136 to the up position. This allows fluid entrapped in the ram cylinder 72 to escape through the ports of the internal slide valve 136, chamber 130, chamber 127 and the restriction in check valve 125 to sequence valve piston 137. The sequence valve piston is forced from its seat and the fluid from the ram cylinder 72 escapes through port 123 to tank at a rate determined by the restriction orfice in check valve 125.

The pressure of the fluid supplied to port 135 acts on the valve piston 121 at chamber 138 in a manner tending to move this member to the right or open position. However, the valve piston is also acted upon by the escaping fluid from the ram cylinder at chamber 127 in a manner tending to maintain the valve piston in the closed position. The effective areas of these two last mentioned chambers are such that the valve piston 121 will not move until the pressure of the fluid in the ram cylinder is twenty-five percent or less of the pressure of the fluid supplied to port 135. When the ram cylinder fluid pressure drops below this critical value the valve piston 121 will begin to move to the left at a rate dependent upon and determined by the check valve 125. As the valve piston begins to move aperture 139 will be uncovered and the ram cylinder fluid pressure will be further reduced while the valve piston continues to move toward its extreme open position. Thus, the opening of the pre-fill or dump valve is accomplished in a minimum of time and in an automatic manner whereby the pressure of the fluid in the ram cylinder is gradually relieved to prevent damage to the various component parts of the apparatus. As the fluid pressure in the ram cylinder is relieved pressure is supplied to the lifting cylinders 88 so that the upper edge roll is retracted from rolling position to open the wheel mill for unloading and loading.

Considering now the schematic diagram in FIGURE 9, the various components and operation thereof will perhaps best be explained in connection with the operation of the fluid circuit. There are actually three stages during each operational rolling cycle for the fluid circuit and the operation thereof will be described for each of these stages. These stages will be referred to as "lowering," "rolling," and "lifting" in the following portion of the specification.

Lowering

Assuming that the mill is initially open—i.e. the various rolls are in their retracted positions—and a blank has been loaded into the wheel mill, it is desired to lower the upper edge roll into rolling contact with the web or plate of the blank. To accomplish this the operator shifts the valve member 141 of a four way valve 142 to the left from the position shown whereby the output of pump 94 is directed through this valve and conduits 143 to port 123 of the pre-fill or dump valve 91 and the rod ends of the lifting cylinders 88. The fluid supplied to the lifting cylinders and the port 123 by the controlled pump 94 is augmented by the output of a constant delivery pump 144 which is connected to the four way valve 142 via conduit 145 having a check valve 146 interposed therein. A motor 147, or other suitable powering means, is employed for driving the pumps 94 and 144 as is the conventional practice.

Thus, fluid will be supplied to the rod ends of the lifting cylinders 88 by both pumps 94 and 144 so that the upper edge roll will be quickly lowered. At the same time fluid is being exhausted from the head ends of the lifting cylinders by way of conduits 148 and solenoid operated valve 149 when in the position shown in the drawing to a counterbalance valve 150 having a check valve 151 in parallel therewith and the four way valve 142 to a suitable reservoir, not shown. The counterbalance valve 150 is of conventional construction, embodying a spring biased valve member, and is operative to maintain a certain back pressure in the head ends of the lifting cylinders 88.

In the preferred method of operation the pressure setting of the counterbalance valve 150 is somewhat lower than the pressure setting of spring biased check valve 124 so that during lowering operations the pre-fill or dump valve is open to the reservoir and the ram cylinder is filled by large volume gravity flow from the reservoir 90. The setting of the check valve 124 in the pre-fill or dump valve prevents any fluid from the pumps 94 and 144 from being supplied to the ram cylinder 72. As an example of the settings of the check valve 124 and counterbalance valve 150, the former may be set to open at a pressure of 700 pounds per square inch pressure while the latter at 600 pounds per square inch.

It will be noted that lowering of the upper edge roll is accomplished in a minimum of time due to the large volume of fluid supplied to the lifting cylinders by the two pumps and that the back pressure developed in these cylinders by the setting of counterbalance valve 150 keeps the apparatus "tight" and prevents play therein due to worn parts, etc.

Rolling

As the upper edge roll is lowered toward rolling position the cross piece 87 of one of the pairs of the lifting cylinders trips a limit switch 152 which, through suitable circuitry, actuates the solenoid of valve 149 to shift the valve spool thereof. It is contemplated that this limit switch will be mounted on the frame 13 or other relative stationary portion of the wheel mill and will be tripped slightly before the upper edge roll engages the blank proper for rolling. The effect of actuating the solenoid valve 149 is to switch the fluid from counterbalance valve 150 to counterbalance valve 155 having a check valve 156 in parallel therewith. Each of the counterbalance valves has a check valve in parallel therewith and the counterbalance valves are in parallel with each other.

The pressure setting of the counterbalance valve 155 is higher than that of counterbalance valve 150 and the check valve 124, as for example 1000 pounds per square inch. Switching to this circuit thus causes the back pressure in the lifting cylinders to rise to a higher value (1000 p.s.i.) as well as the pressure of the fluid in the conduits 143.

As soon as this pressure begins to build up the pump 144 is effectively disconnected from the circuit through an unloading relief valve 157 whose pressure setting may be 600 pounds per square inch or slightly thereabove, for example. Thus when relief valve 157 is actuated the pump 94 is the only source operative to supply fluid to the various lifting and ram cylinders. Fluid flow from pump 94 to pump 144 is of course prohibited by the check valve 146.

As the pressure continues to build up in the fluid control circuit the ball of the check valve 124 is forced from its seat thereby causing the dump valve 91 to be actuated in a manner which isolates the ram cylinder 72 from the reservoir 90 and the only fluid supplied to the fluid cylinder is that delivered by the variable volume pump 94. The operation of the pre-fill or dump valve in response to this change in pressure has been explained previously in the specification.

Obviously the change in pressure in the fluid circuit will not take place instantaneously since the circuit must have some finite response time and it is for this reason that the limit switch 152 is actuated prior to the edge roll engaging the blank. By the time the edge roll does engage the blank, however, the proper and relative steady state pressure condition is evident in the fluid circuit and the only supply to the ram cylinder 72 is the output of the pump 94. It will be noted that the port 135 of the pre-fill valve is at this time connected to tank through conduit 158 and four way valve 142 so that the valve piston member 121 is positively in the closed position during rolling.

The rolling operation continues with the output of pump 94 and being controlled by the various integrated control instrumentalities described above and the downward movement of the ram cylinder being dependent upon said output.

If at any time it is desired to stop the downward movement of the upper edge roll during rolling, for curing the blank as is known in the art, for example, the operator shifts the spool of valve 142 to the center position wherein all ports thereof are blocked and the edge roll will remain at one position due to the resistive force of the blank. In this condition the pressure delivered by pump 94 will build up and be discharged over relief valve 160 to tank. This relief valve may be set for 2000 pounds per square inch and it will be noted that the maximum rolling pressure exerted by the edge roll can be controlled by the setting of this valve since the rolling force is equal to the pressure of the fluid delivered by the pump 94 times the area of the ram cylinder minus the pressure setting of the counterbalance valve 155 times the total effective area of the lifting cylinders.

*Lifting*

After the rolling operation is completed, the web of the blank having been formed in accordance with a predetermined pattern, it is necessary to retract the upper edge roll so that the finished workpiece may be ejected and another blank loaded into the machine. To accomplish this the operator actuates the four way valve 142 in such a manner that the spool thereof is shifted to the right of that position shown in FIGURE 9 of the drawing thereby connecting the pumps 94 and 144 to the head ends of the lifting cylinders 88 via the check valve 151 in parallel with the counter-balance valve 150 and the solenoid operated valve 149 which is actuated so that its spool is returned to the position shown in the drawing. The actuation of valves 142 and 144 can be interconnected in such a manner that these two valves will always bear this relation during lifting operations as is readily apparent.

Shifting of valve 142 also supplies fluid under pressure to the port 135 of the pre-fill or dump valve and starts decompression of the ram cylinder to gradually relieve the pressure therein. The exact decompression operation and functioning of the pre-fill or dump valve has been hereinbefore completely explained. When the valve 142 is shifted the rod ends of the lifting cylinders, as well as the port 123, are connected directly to tank.

Thus, when the pressure in the ram cylinder has been relieved to a certain extent, the fluid supplied to the head ends of the lifting cylinders will be operative to retract the upper edge roll. It will be noted that during both lowering and lifting operations fluid is supplied by both of the pumps to effect fast but yet controlled movement of the upper edge roll. However, during rolling only the controlled variable delivery pump is operative to supply fluid to the ram cylinder 72. The circuit above described when used in connection with the specific control instrumentalities employed for varying the output of the variable delivery pump allows the completion of the various objects of the invention recited herein. The control is characterized by its utmost simplicity in operation. All of the measurements, such as wheel growth, etc., can be fed automatically to the integrating linkage means and if the valve 142 and 149 are interconnected the operator has only one control to operate during the entire controlled rolling cycle—that is a control for changing the position of the valve spool in valve 142. The machine is also characterized by its extreme versatility since every possible set-up adjustment is provided thereby allowing blanks to be rolled to almost any specifications desired.

As indicated in the preceding discussion of the fluid circuit, the pressure responsive settings of the various valves are important for the correct operation of the apparatus. Listed below are suggested pressure settings for the various valves but it should be understood that this list is by way of suggestion only and not intended to limit the scope of the invention.

| Valve: | Pressure setting (p.s.i.) |
|---|---|
| Internal pre-fill check valve 124 | 700 |
| Counterbalance valve 150 | 600 |
| Counterbalance valve 155 | 1000 |
| Relief valve 157 | 600+ |
| Relief valve 160 | 2000 |

*Alternate fluid circuits*

Figure 10:
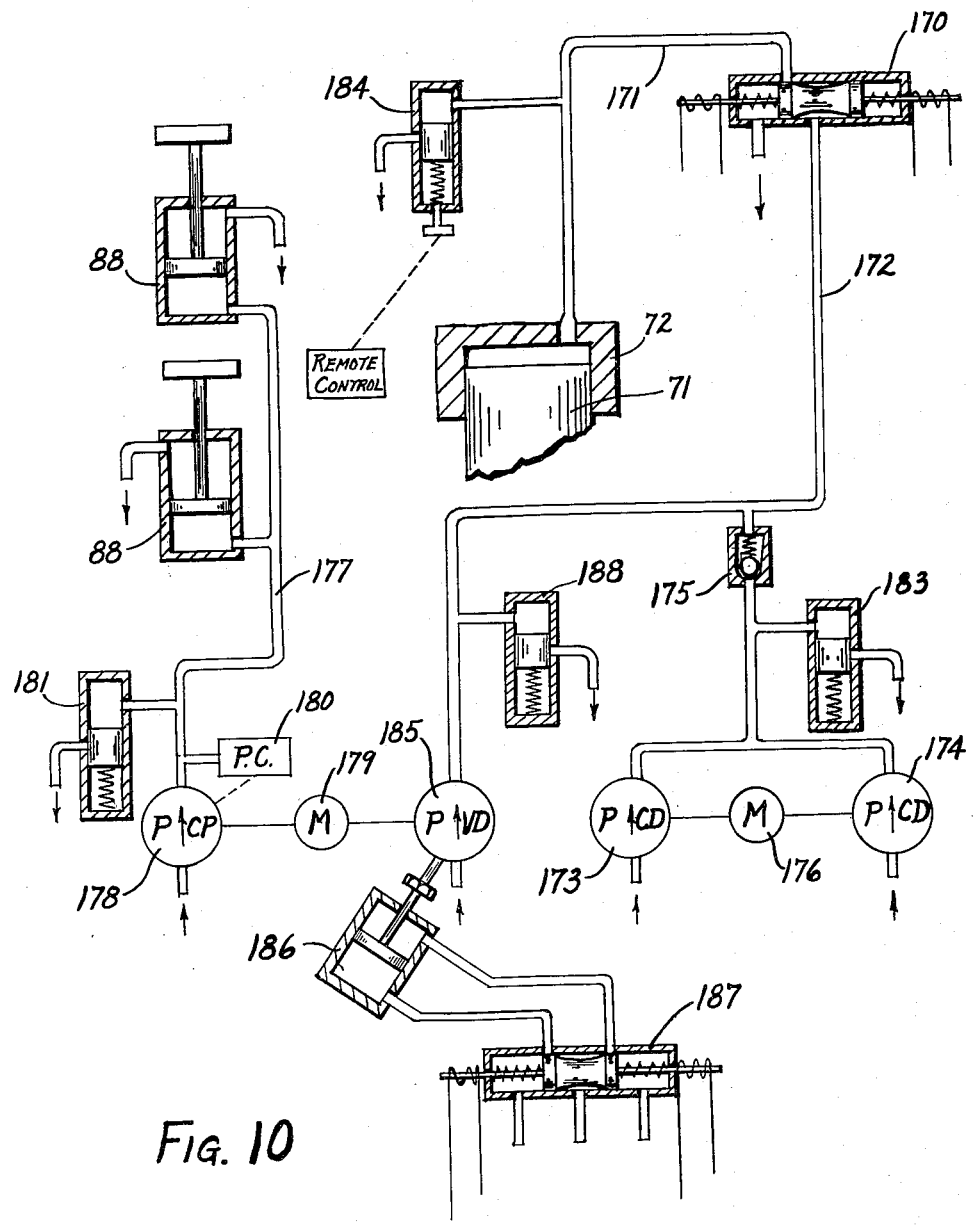
FIGURES 10 and 11 show alternate fluid control circuits for actuating the edge roll of a wheel mill.
Figure 11:
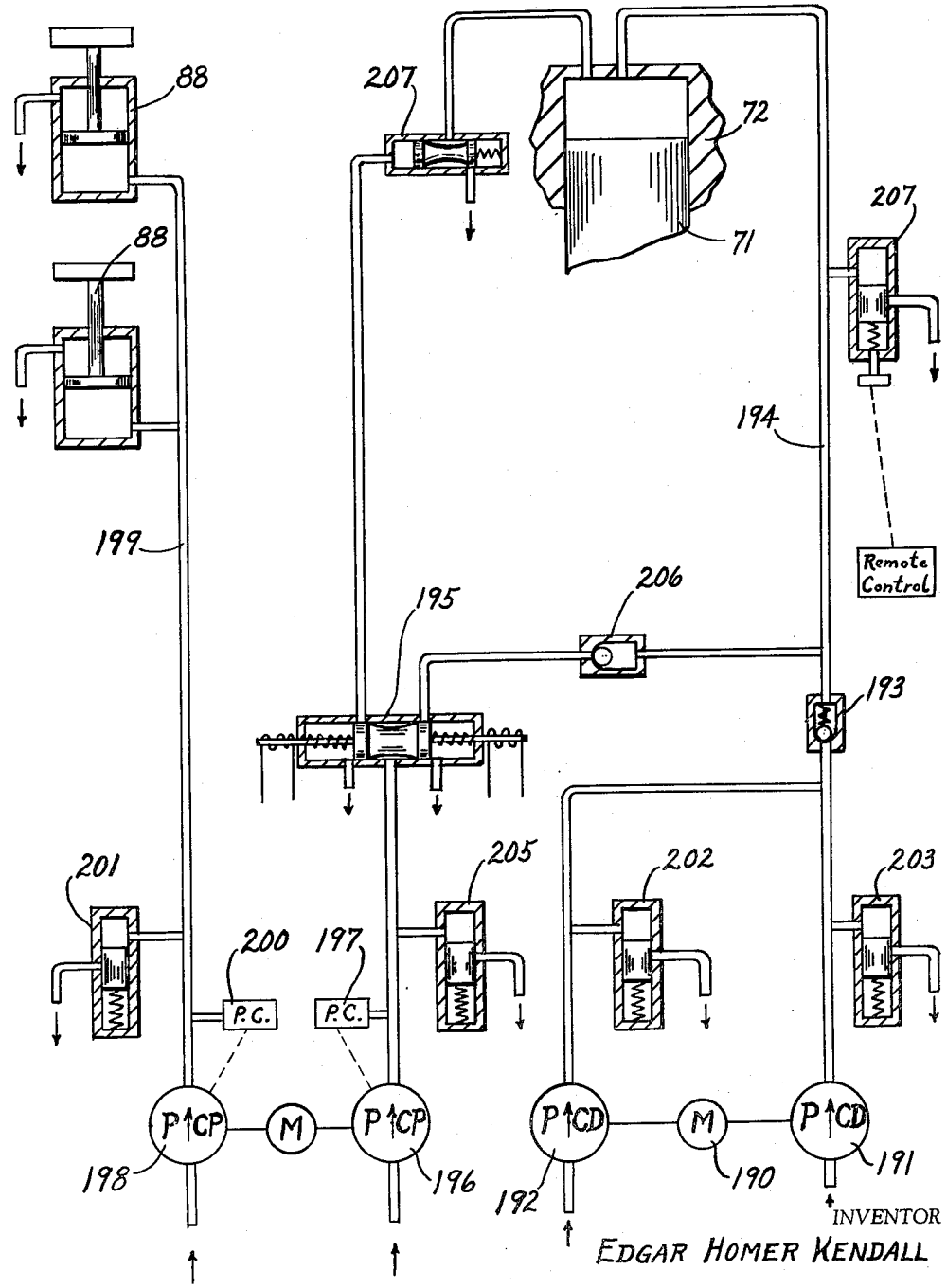

In FIGURES 10 and 11 of the drawing there is shown in schematic fashion two alternate fluid circuits for the upper edge roll of a wheel rolling mill. These circuits are adapted to be used with a wheel mill of the general type described wherein the upper edge roll is adapted for vertical movement upon proper actuation of the ram and lifting cylinders. These circuits, although they may embody automatic integrating and controlling means for effecting a tapered web or plate portion of a wheel, will not be described in connection with such means. The specific arrangement of component parts will perhaps best be understood with reference to the operation thereof as disclosed below.

In the operation of the fluid circuit shown in FIGURE 10 it will be assumed that initially the edge roll is in the retracted position and that a blank has been loaded into the machine and is ready for rolling. To initiate a rolling operation the operator actuates a valve 170 by way of suitable control means, such as solenoids, for example, to shift the valve spool thereof to the left from the position shown in FIGURE 10 of the drawing. This connects conduit 171 leading to the ram cylinder 72 with conduit 172 which is in turn connected to a pair of constant delivery pumps 173 and 174 through a large check valve 175. The pumps 173 and 174 are driven by a motor 176 as is conventional practice. The effect of shifting the valve 170 is to allow the pumps 173 and 174 to deliver their output to the ram cylinder thereby forcing the edge roll downward toward the blank.

The lifting cylinders 88 are connected via a conduit 177 to a constant pressure source 178 which is powered by motor 179 and is interconnected with a pressure compensating apparatus 180. The pressure compensating apparatus 180 is of such a nature that the pump 178 is actuated only to maintain a predetermined pressure in the conduit 177 and hence on the head ends of lifting cylinders 88. The pressure compensating apparatus 180 has its pressure setting adjusted at a value lower than the pressure exerted on the ram cylinder by the fluid supplied by pumps 173 and 174 and thus during lowering operations the output of pump 178 will be zero. Interposed in the conduit 177 leading to the lifting cylinders 88 is a relief or unloading valve 181 which has a pressure setting that is somewhat higher than the maximum pressure setting of the pressure compensating apparatus 180 but yet is appreciably lower than the pressure applied to the upsetting ram 72. In this manner the edge roll is lowered against a certain back pressure (determined by the setting of relief valve 181) to insure a tight mechanical setup and eliminate the need for mechanical alteration of the lifting cylinder mountings due to looseness, etc., while the excess fluid in the head ends of the lifting cylinders 88 is exhausted through the relief valve 181.

As the edge roll approaches or comes into rolling contact with the blank a limit switch, not shown, or other suitable position responsive means is actuated to return the valve spool of valve 170 to its original position whereby all parts of this valve are blocked. In this stage of the operational rolling cycle the pump 178 and the pressure compensating apparatus 180 associated therewith are operative only to maintain a predetermined back pressure on the lifting cylinders 88 and the output of pumps 173 and 174 will be unloaded over a relief valve 183 to exhaust. The pressure setting of valve 183 is such that it will not open until pressures in excess of the maximum pressures needed or contemplated for rolling are obtained in order that fast filling of the ram cylinder is accomplished during lowering operations.

If, when the valve 170 is centered, the blank is engaged by the edge roll pressure will be exerted on the ram cylinder and consequently pressure will build upon the fluid entrapped in the ram cylinder and other fluid circuitry on the ram cylinder side of the valve 170. The maximum pressure permissible is controlled by an adjustable relief valve 184 as is apparent and preferably the pressure setting of this relief valve is adjustable from a remote control station whereby the operator can easily adjust the maximum rolling pressure exerted by the ram cylinder.

During lowering and the above described rolling or pre-rolling portion of the operational cycle a variable delivery pump 185, which is also driven by motor 179, is controlled by position of the piston of control cylinder 186 to deliver a predetermined output. The pump 185 and the control cylinder therefor is similar in arrangement to the pump 94 and cylinder 95 described in connection with the fluid circuit shown in FIGURE 9 of the drawing. When the piston of the control cylinder is in one extreme position the pump 185 has a certain minimum output, preferably zero, while when the piston is in the other extreme position the pump has a predetermined maximum output. The position of the piston of the control cylinder is in turn controlled by a solenoid operated four-way valve 187 as shown. It is contemplated that during these two stages of the operational cycle that the output of pump 185 will be zero so that the ram cylinder is supplied solely by pumps 173 and 174. However, if desired, this pump may be controlled to deliver fluid during lowering to augment that supplied by pumps 173 and 174 to effect yet faster lowering of the edge roll. If the latter be the case, the output of pump 185 is discharged to exhaust when valve 170 is returned to its neutral position over relief valve 188 whose pressure setting is somewhat higher than relief valve 183.

As heretofore intimated, it is desirable that some means be provided for further lowering the edge roll at a highly controlled rate during rolling operations and in the present fluid circuit this is accomplished by pump 185, control cylinder 186 and valve 187. To effect further controlled lowering of the edge roll during rolling, or edging as it is called in the art, the operator energizes the valve 187 through various control instrumentalities, not shown, to move the piston of fluid control cylinder 186 so that the output of pump 185 is established at a new predetermined level. The valve spool of valve 170 is again shifted to the left and the output of pump 185 is directed to the ram cylinder 72. It will be noted that only pump 185 will be operative to supply fluid to the ram cylinder because of the relative settings of the relief valve 183 and 188 as set forth above whereby pumps 173 and 174 are discharged to exhaust as soon as pressure begins to build up in the fluid system due to the relatively low setting of relief valve 183. If the edge roll descends too fast the operator may actuate relief valve 184 to spill some of the oil delivered by pump 185 to tank. Obviously, the control of this relief valve can be operated in a predetermined pattern so that the edge roll is properly lowered during edging. Of course, it is also within the purview of the invention to replace valve 187 with controlling and integrating means of the general type and for the same general purposes as disclosed earlier in the specification whereby the output of pump 185 is regulated in a completely automatic manner. Edging continues until the edge roll reaches its final down position which may be regulated by stops such as the cross pieces in a manner disclosed above.

After rolling is completed it is necessary to lift the upper edge roll to open the machine for ejection of the finished workpiece and loading of another workpiece. For this phase of the operational cycle the valve 170 is actuated to connect conduit 171 with the exhaust port of the valve and to block the port leading to conduit 172. In this position of the valve spool the ram cylinder will be connected to exhaut and consequently pressure in conduit 177 will drop thereby causing the pressure compensating apparatus 180 to actuate pump 178 to deliver fluid to the head end of the lifting cylinders 88 to lift the edge roll. During retraction the output of pumps 185, 173 and 174 is, of course, shunted to tank through the various relief and unloading valves associated therewith. After the edge roll has been raised a certain distance the valve spool of valve 170 is returned to its original position and the apparatus is ready for another operational rolling cycle.

Referring now to FIGURE 11 of the drawing, there is shown yet another fluid control system for an edge roll of a wheel mill of the type disclosed having a ram and lifting cylinders. In the operation of this circuit it will be assumed that the edge roll is initially retracted. To effect lowering of the edge roll the operator energizes motor 190 which drives constant delivery pumps 191 and 192 to supply fluid via spring biased check valve 193 and conduit 194 to the head end of the ram cylinder. To effect extremely rapid lowering of the edge roll the valve spool of valve 195 is shifted to the left so that the output of pumps 191 and 192 is augmented by the fluid output of pump 196 which is controlled by pressure compensator 197. It will be noted that lowering operations are carried out against a certain back pressure in the lifting cylinders which are connected to pump 198 by conduit 199. The pump 198 is controlled by pressure compensator 200 so that the volume of fluid supplied thereby is determined by the pressure existant in the conduit 199. During lowering the output of pump 198 will be zero and the excess pressure in the head ends of the lifting cylinders will be exhausted over a relief valve 201. The pressure setting of relief valve 201 is, of course, lower than the maximum rolling pressure desired and slightly higher than the pressure setting of pressure compensator 200.

When the edge roll comes in pressure contact with the blank, pressure will begin to build up in the fluid circuit and this causes the outputs of pumps 191 and 192 to discharge to tank through the relief valves 202 and 203 associated therewith. The pressure settings on relief valves 202 and 203 is relatively low so that the pumps 191 and 192 will be effectively shunted from the circuit as soon as pressure begins to build up in the fluid system. If the valve 195 has already been shifted to allow connection between pump 196 and the ram cylinder 72 this pump will maintain a certain rolling pressure in the ram cylinder. If, however, the valve 195 has not been shifted from its shown position the pump 196 will discharge through relief valve 205 associated therewith. The pressure setting of this relief valve is relatively high, preferably above the setting of pressure compensator 197. When the ram and edge roll have moved a certain predetermined distance the operator can shift valve 195 to connect pump 196 with the ram cylinder and the pressure compensator 197 insures a constant fluid pressure in the ram cylinder. The check valves 193 and 206 prevent undesired interconnection of the pumps 191, 192 and 196 as is readily apparent. This circuit is characterized by its flexibility in that normal rapid lowering can be effected by pumps 192 and 191 or extremely rapid lowering is provided by augmenting the output of these last mentioned pumps with the output of pump 196.

During rolling operations the pump 196 is the only pump connected with the ram cylinder and a constant pressure is maintained by this source. If the operator finds that edging is proceeding too fast he may spill some of the fluid supplied by pump 196 over relief or unloading valve 207 which is adjustable from a remote control station. Of course, this valve may be operated in response to automatic control means in accordance with a predetermined pattern.

After rolling is completed the edge roll may be retracted by shifting valve 195 to the left thereby connecting pump 196 to pilot valve 208 and causing the operator of this valve to move to the right to connect the ram cylinder to exhaust. As the pressure is relieved in the ram cylinder the pump 198 will gain control and supply fluid to the head ends of lifting cylinders 88 to retract the edge roll. It is noted that the valve 208 is either blocked or connected to exhaust by valve 195 during actual filling and rolling operations so that only conduit 194 is in effective communication therewith during these phases of the rolling operations.

Although the alternate fluid circuits described above have not been shown to include controlling or integrating means it will be understood that the same could be provided with such means to allow the rolling of tapered wheels and other similar products when desired.

Conclusion

It should be apparent that I have accomplished the objects initially set forth. There is provided improved means for mounting the edge rolls of a wheel rolling mill which is characterized by its relative simplicity but yet is rugged and adapted to be readily adjusted thereby increasing the versatility of a wheel rolling mill. There is also provided a new and novel actuating means for the upper edge roll whereby the same may be controlled in an accurate and precise manner to obtain desired and acceptable final products, such as wheels having tapered plate portions, for example. This actuating means comprises a new and novel controlling and integrating means which is responsive to the instantaneous wheel growth, the instantaneous position of the edge roll and the initial dimensions of the blank. The integrating and controlling means in turn controls a variable delivery pump to supply fluid to the ram cylinder for moving the edge roll.

The fluid circuits disclosed herein are extremely well adapted for use with a wheel rolling mill of the type described. A large volume source is operative to quickly lower the edge roll to close the mill and this large volume source is then shunted while further movement of the edge roll is accomplished by a controlled relatively high pressure-low volume delivery to the ram cylinder. This affords rapid closing of the mill but yet allows accurate control of rolling within small tolerances. The various fluid circuits are also characterized by their novel arrangement of component parts, such as the pre-fill or dump valve, pilot valve, etc. which allow the completion of rolling operations.

Having thus described and shown several illustrative embodiments of the invention, reference should be had to the following appended claims in determining the true scope of the invention since many changes may be made in the illustrated embodiments without departing from the teachings of the invention.

I claim:

1. A mill for rolling wheels and the like comprising a frame, a pair of divergently related tubular housings, a pair of forming rolls for working the opposite side faces of a workpiece, said forming rolls being journaled in said housings and being positioned at the converging ends thereof, the principal axes of said forming rolls and said housings lying in a common plane, means mounting said housings in said frame for pivotal movement in said plane, means to urge pivotal movement of at least one of said forming rolls, said last mentioned means comprising a fixture carried by said one of said forming rolls, a ram cylinder having a ram, means mounting said ram cylinder from said frame in relatively stationary relation with respect to said one of said forming rolls, said ram engaging said fixture for lowering said one of said forming rolls, a plurality of guide rods carried by said fixture, said guide rods extending generally parallel with said ram cylinder and being spaced transversely outwardly thereof, cross pieces spanning the extending ends of pairs of said guide rods transversely outwardly of said ram cylinder, lifting cylinders drivingly connected to said cross pieces, said lifting cylinders being mounted in relatively stationary relation from said frame with respect to said one of said forming rolls, and said ram cylinder and said lifting cylinders being disposed generally in the same transverse plane, said ram cylinder having a pair of transversely extending trunnions, means journaling said trunnions in said frame, said means journaling comprising annular members each having side wall portions of different thickness dimensions throughout their circumferences, and means to simultaneously rotate said annular members to change the position of said one of said forming rolls.

2. A mill for rolling wheels and the like comprising a frame, a pair of divergently related tubular housings, a pair of forming rolls for working the opposite side faces of a workpiece, said forming rolls being journaled in said housings and being positioned at the converging ends thereof, the principal axes of said forming rolls and said housings lying in a common plane, means mounting said housings in said frame for pivotal movement in said plane, means to urge pivotal movement of at least one of said forming rolls, said last mentioned means comprising a fixture carried by said one of said forming rolls, a ram cylinder having a ram, means mounting said ram cylinder from said frame in relatively stationary relation with respect to said one of said forming rolls, said ram engaging said fixture for lowering said one of said forming rolls, a plurality of guide rods carried by said fixture, said guide rods extending generally parallel with said ram cylinder and being spaced transversely outwardly thereof, cross pieces spanning the extending ends of pairs of said guide rods transversely outwardly of said ram cylinder, lifting cylinders drivingly connected to said cross pieces, said lifting cylinders being mounted in relatively stationary relation from said frame with respect to said one of said forming rolls, and said ram cylinder and said lifting cylinders being disposed generally in the same transverse plane, said ram cylinder having a pair of transversely extending trunnions, means journaling said trunnions in said frame, a generally U-shaped member resting on and supported by each of said trunnions, the leg portions of each of said generally U-shaped members being apertured to receive said guide rods, and said lifting cylinders being mounted on said U-shaped members.

References Cited in the file of this patent

UNITED STATES PATENTS

| | | |
|---|---|---|
| 846,942 | Von Philip | Mar. 12, 1907 |
| 1,327,635 | Slick | Jan. 13, 1920 |
| 1,606,905 | Smith | Nov. 16, 1926 |
| 1,730,642 | Budd et al. | Oct. 8, 1929 |
| 1,982,711 | Vickers | Dec. 4, 1934 |
| 2,035,598 | Eckfeldt et al. | Mar. 31, 1936 |
| 2,194,078 | Simonds | Mar. 19, 1940 |
| 2,267,380 | Tyler | Dec. 23, 1941 |
| 2,302,922 | Tucker | Nov. 29, 1942 |
| 2,406,219 | Hight et al. | Aug. 20, 1946 |
| 2,545,246 | Tucker | Mar. 13, 1951 |
| 2,545,921 | Goodwillie | Mar. 20, 1951 |
| 2,573,333 | Hillix | Oct. 30, 1951 |
| 2,588,651 | Nelson | Mar. 11, 1952 |
| 2,636,406 | Salter | Apr. 28, 1953 |
| 2,763,168 | Kendall | Sept. 18, 1956 |
| 2,776,585 | Kendall | Jan. 8, 1957 |

FOREIGN PATENTS

| | | |
|---|---|---|
| 22,419 | Australia | Sept. 16, 1929 |
| 1,137,605 | France | Jan. 14, 1957 |
| 540,316 | Italy | Mar. 3, 1956 |
| 776,592 | Great Britain | June 12, 1957 |